US008469832B2

(12) United States Patent
Gillett et al.

(10) Patent No.: US 8,469,832 B2
(45) Date of Patent: Jun. 25, 2013

(54) SWING APPARATUS WITH DETACHABLE INFANT HOLDING DEVICE

(75) Inventors: Sharon A Gillett, Mohnton, PA (US); Schantal M. Kane, Downingtown, PA (US); Ryan N. Miller, Lancaster, PA (US); Peter R. Tuckey, Morgantown, PA (US)

(73) Assignee: Wonderland Nurserygoods Company Limited (HK)

( * ) Notice: Subject to any disclaimer, the term of this patent is extended or adjusted under 35 U.S.C. 154(b) by 327 days.

(21) Appl. No.: 12/916,168

(22) Filed: Oct. 29, 2010

(65) Prior Publication Data

US 2011/0105237 A1    May 5, 2011

Related U.S. Application Data

(60) Provisional application No. 61/280,404, filed on Nov. 3, 2009, provisional application No. 61/338,525, filed on Feb. 22, 2010.

(51) Int. Cl.
*A63G 9/12* (2006.01)
*A63G 9/16* (2006.01)

(52) U.S. Cl.
USPC .......................................... 472/118; 297/273

(58) Field of Classification Search
USPC .................. 472/118–125; 273/273, 276, 277, 273/281, 282
See application file for complete search history.

(56) References Cited

U.S. PATENT DOCUMENTS

| 5,562,548 | A  | * | 10/1996 | Pinch et al. | 472/119 |
| 7,258,617 | B2 | * | 8/2007  | Chen | 472/119 |
| 7,422,524 | B2 | * | 9/2008  | Gregorian | 472/118 |
| 7,445,559 | B2 | * | 11/2008 | Kakuda | 472/118 |
| 7,563,170 | B2 | * | 7/2009  | Bellows et al. | 472/29 |
| 2005/0189796 | A1 | | 9/2005 | Gregorian | |
| 2006/0211506 | A1 | | 9/2006 | Kakuda | |
| 2006/0276253 | A1 | | 12/2006 | Chen | |

FOREIGN PATENT DOCUMENTS

| CN | 2807946 Y | 8/2006 |
| CN | 201167744 Y | 12/2008 |
| CN | 101548836 A | 10/2009 |
| DE | 112007002469 T5 | 9/2009 |
| EP | 2160962 A2 | 3/2010 |
| GB | 2440260 A | 1/2008 |
| WO | 2007056684 A3 | 5/2007 |

* cited by examiner

*Primary Examiner* — Kien Nguyen
(74) *Attorney, Agent, or Firm* — David I. Roche; Baker & McKenzie LLP

(57) ABSTRACT

A swing apparatus comprises a support frame, a plurality of swing arms pivotally connected with the support frame, a mount platform connected with the swing arms, wherein the swing arms are operable to swing the mount platform relative to the support frame, and a portable infant holding device adapted to removably fasten with the mount platform. Once it is installed on the mount platform, the infant holding device can be positioned above the support frame and swing arms, in particular above the pivot links that connect the swing arms with the support frame. As a result, the swing apparatus can be used in a more versatile manner, and access to the infant holding device can be facilitated for placement and removal of the infant.

20 Claims, 14 Drawing Sheets

SWING APPARATUS WITH DETACHABLE INFANT HOLDING DEVICE

CROSS-REFERENCE TO RELATED APPLICATION(S)

This application respectively claims priority to U.S. Provisional Application No. 61/280,404 filed on Nov. 3, 2009, and U.S. Provisional Application No. 61/338,535 filed on Feb. 19, 2010.

BACKGROUND

1. Field of the Invention

The present invention relates to an infant swing apparatus, and more particularly to a swing apparatus capable of accommodating a portable infant holding device.

2. Description of the Related Art

Caregivers usually rely on a swing apparatus to facilitate the care of an infant or young child. The swing apparatus can be used to provide a comfortable, safe and entertaining environment to the child. Conventionally, a swing apparatus is made up of a seat that can securely hold the child, and a frame having swing arms from which the seat is suspended. The swing arms are pivotally connected to the frame so as to be able to swing the seat back and forth, or sideways. In order to provide the ability to customize the swing apparatus to either a back and forth or sideways swinging configuration, a current approach provides an adjustment mechanism that is connected with the swing arm and placed above the seat. The adjustment mechanism allows rotating the seat to a position that suits the child's need. While this design approach can adjust the seat to the desired swinging motion, it may restrict the accessibility for the caregiver, especially when placing or removing the child from the swing apparatus.

Therefore, there is a need for an improved swing apparatus that can provide both back and forth and sideways swing configurations, and address at least the foregoing issues.

SUMMARY

The present application describes a swing apparatus that has a support frame adapted to removably fasten a variety of infant holding devices thereon. The support frame includes a mount platform that can be swung via a plurality of swing arms pivotally connected between the mount platform and the support frame. The infant holding device can be installed on the mount platform in multiple orientations to achieve either of back and forth swing movements, or sideways swing movements. Examples of the infant holding device can include, without limitation, portable infant seats such as car seats, bassinets, and the like.

In one embodiment, the swing apparatus comprises a support frame, a plurality of swing arms pivotally connected with the support frame, a mount platform connected with the swing arms, wherein the swing arms are operable to swing the mount platform relative to the support frame, and a portable infant holding device adapted to removably fasten with the mount platform.

In another embodiment, the swing apparatus can comprise a support frame, a plurality of swing arms pivotally connected with the support frame, a mount platform connected with the swing arms, wherein the swing arms are operable to swing the mount platform relative to the support frame, and a portable infant holding device adapted to fasten with the mount platform at a position above the swing arms.

At least one advantage of the swing apparatus described herein is the ability to accommodate a variety of infant holding devices on the swing apparatus. Accordingly the swing apparatus can be used in a more versatile manner. Moreover, once it is installed on the mount platform, the infant holding device can be positioned above the support frame and swing arms, in particular above the pivot links that connect the swing arms with the support frame. As a result, access to the infant holding device can be facilitated for placement and removal of the infant.

DETAILED DESCRIPTION OF THE EMBODIMENTS

The present application describes a swing apparatus that has a support frame adapted to removably fasten a variety of infant holding devices thereon. The support frame includes a mount platform that can be swung via a plurality of swing arms pivotally connected between the mount platform and the support frame. The infant holding device can be installed on the mount platform in multiple orientations to achieve either of back and forth swing movements, or sideways swing movements. Examples of the infant holding device can include, without limitation, portable infant seats such as car seats, bassinets, and like devices capable of carrying or supporting a child.

Figure 1:
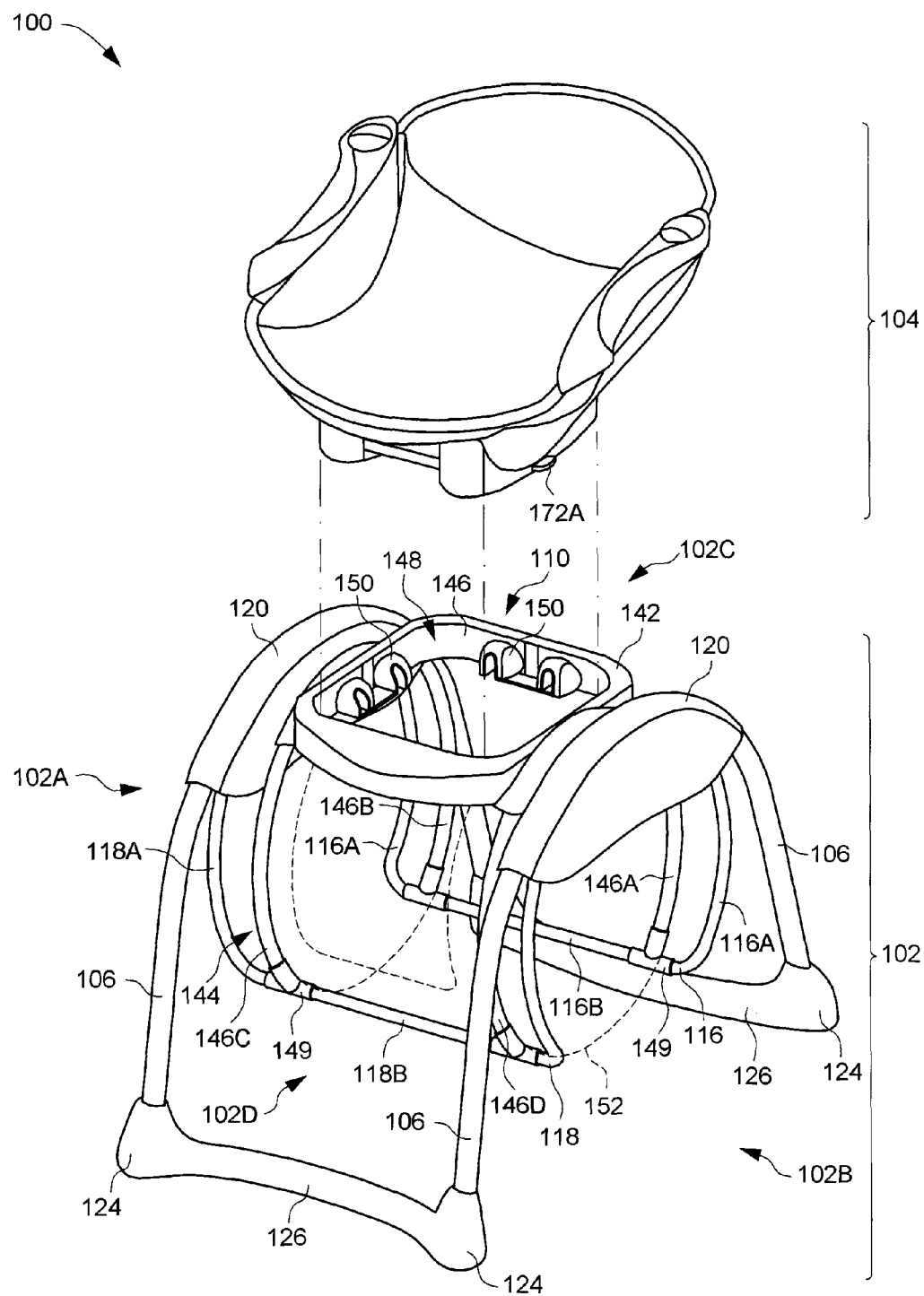
FIG. 1 is a schematic view illustrating one embodiment of a swing apparatus having an infant holding device detached from a support frame.
Figure 2:
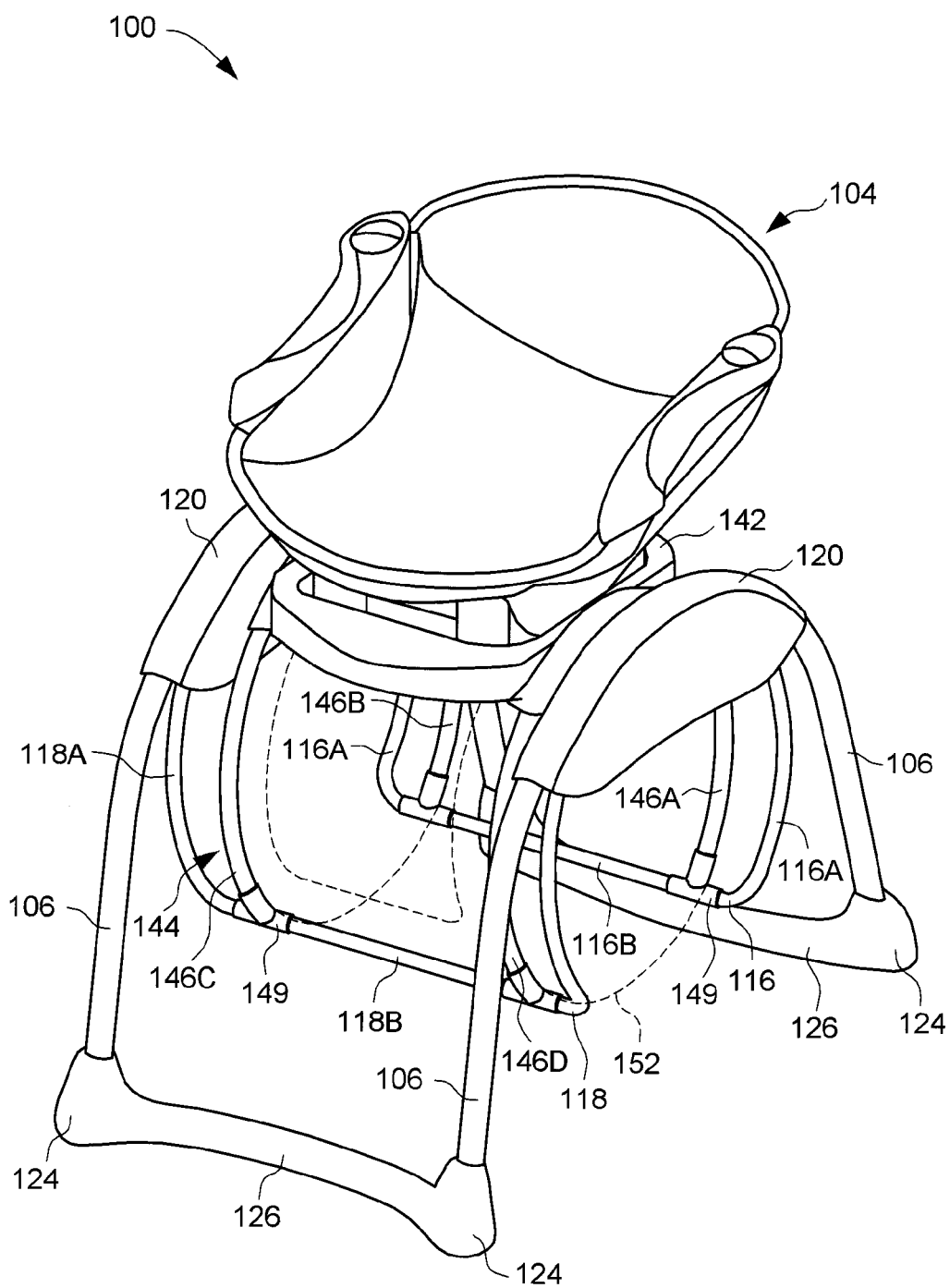
FIG. 2 is a schematic view illustrating the swing apparatus of FIG. 1 having the infant holding device attached on the support frame.

FIGS. 1 and 2 are perspective views illustrating one embodiment of a swing apparatus 100. The swing apparatus 100 can comprise a support frame 102, and a portable infant holding device 104 that can be detachably mounted on the support frame 102 (FIG. 1 shows the infant holding device 104 detached from the support frame 102, whereas FIG. 2 shows the infant holding device 104 attached on the support frame 102). The support frame 102 can comprise a first side 102A, a second side 102B opposite to the first side 102A, a third side 102C contiguous to the first and second side 102A and 102B, and a fourth side 102D opposite to the third side 102C.

Each of the opposite first and second sides 102A and 102B of the support frame 102 can include a plurality of upstanding legs 106. More specifically, the upstanding legs 106 can be formed as two assemblies of tubular structures having a generally U-shape or V-shape. The two assemblies of upstanding legs 106 are spaced apart from each other by a space in which is assembled a mount platform 110 adapted to receive the installation of the infant holding device 104. The mount platform 110 is movably connected with a plurality of swing arms 116 and 118 that are pivotally coupled with the support frame 102. The swing arms 116 and 118 can hold the mount platform 110, and also swing the mount platform 110 (and infant holding device 104 placed thereon) relative to the support frame 102 between the opposite third and fourth sides 102C and 102D.

Figure 3:
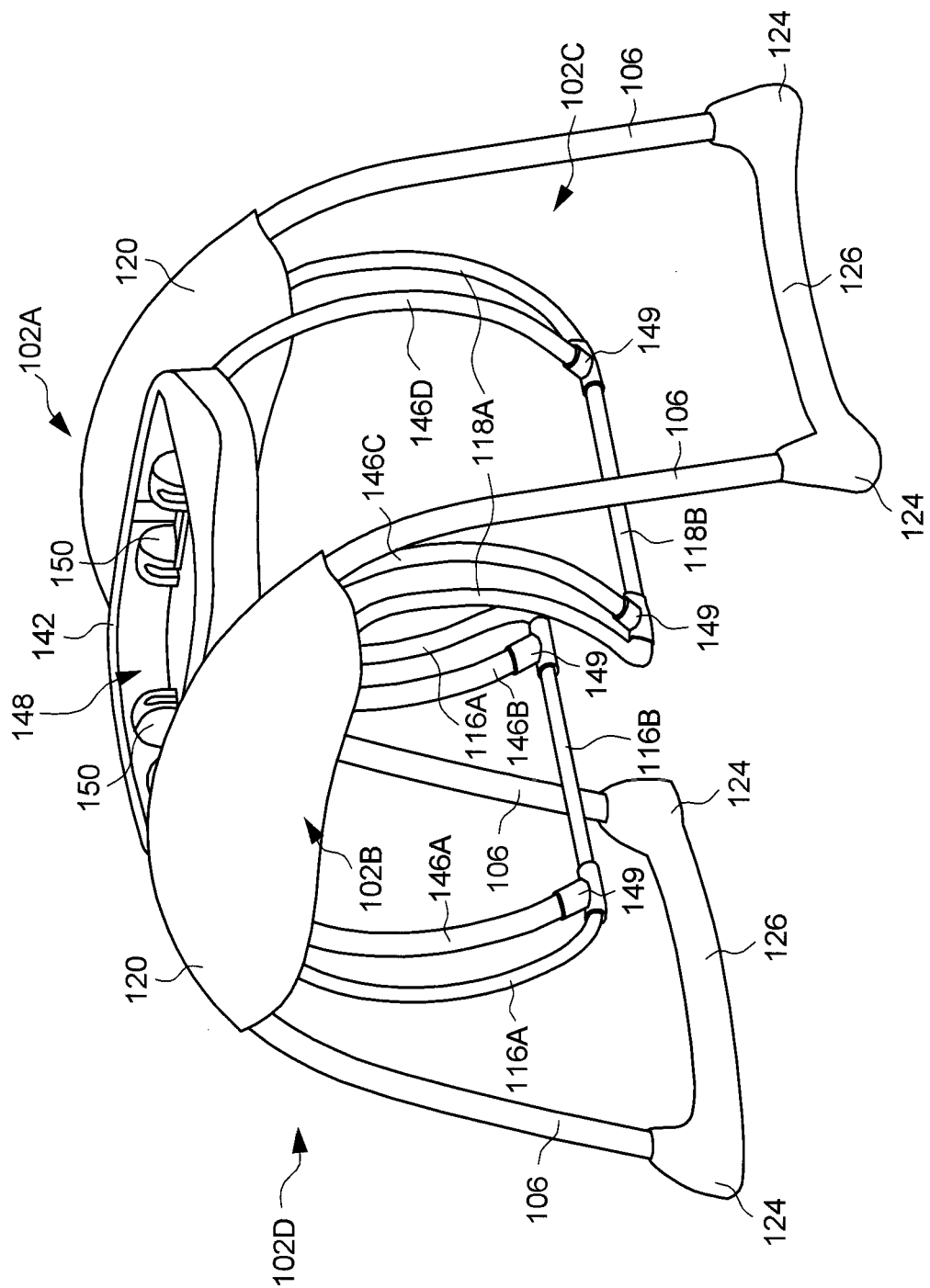
FIG. 3 is a perspective view illustrating the support frame of the swing apparatus.
Figure 4:
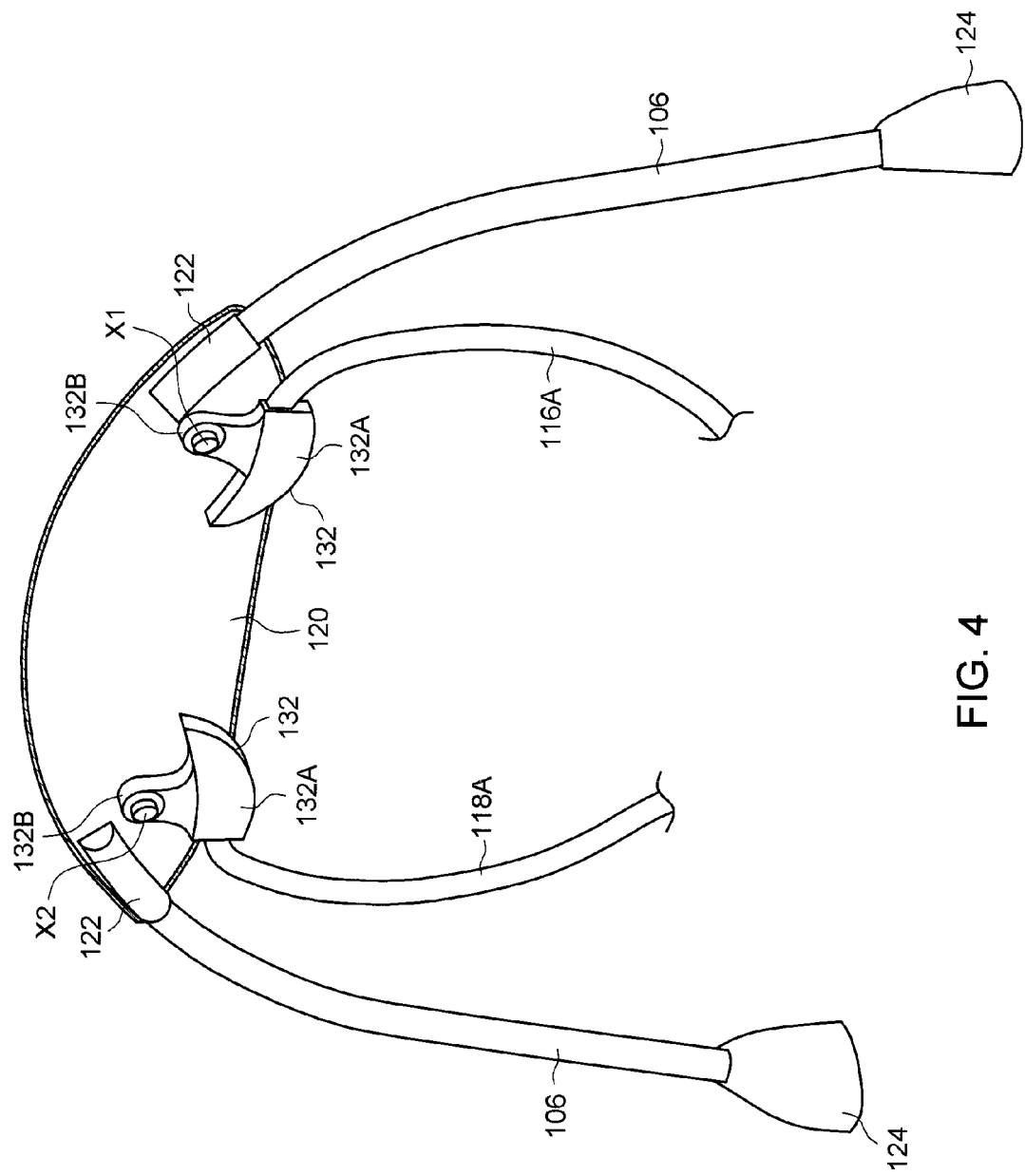
FIG. 4 is a schematic view showing how a plurality of swing arms are connected with the support frame.

FIG. 3 is a perspective view of the support frame 102, and FIG. 4 is a schematic view showing how the swing arms 116 and 118 are connected with the support frame 102. As shown, the upstanding legs 106 provided on the first and second sides 102A and 102B of the support frame 102 can respectively have upper ends joined with a housing 120. More specifically, the housing 120 can be formed with a curved shape having a hollow interior. Two opposite sides of the housing 120 can be respectively provided with coupling fixtures 122 through which upper ends of the upstanding legs 106 can be fixedly secured inside the housing 120. In turn, lower ends of the upstanding legs 106 can be fixedly mounted with anti-slip pads 124. Transverse bars 126 can also be used to link the lower ends of the upstanding legs 106 on the first and second sides 102A and 102B of support frame 102 for keeping the opposite upstanding legs 106 in alignment with each other, promoting stability of the support frame 102.

As shown in FIGS. 3 and 4, the swing arms 116 and 118 can be joined with the first and second sides 102A and 102B of the support frame 102, and are disposed symmetrically facing each other on the two opposite sides 102C and 102D. More specifically, each of the swing arms 116 and 118 can have a generally U-shaped profile having two parallel side sections (designated 116A for the swing arm 116 and 118A for the swing arm 118), and a transverse section (designated 116B for the swing arm 116 and 118B for the swing arm 118) joining lower ends of the side sections. In one embodiment, the side sections 116A of the swing arm 116 and side sections 118A of the swing arm 118 can be disposed symmetric to each other and have a curved or arc shape with a curvature oriented toward the center of the support frame 102. In this manner, the weight distribution of the swing arms 116 and 118 may be desirably designed so that swinging movements can be performed in a stable and smooth manner. It is worth noting that while the embodiment shown herein describes a particular shape for the swing arms 116 and 118, other configurations may also be possible.

Referring to FIG. 4, the upper end of each side section 116A and 118A can be pivotally connected with the housing 120 via a coupling link 132. In one embodiment, the coupling link 132 can have a shoe shape with a hollow first portion 132A fixedly secured with the upper end of one side section 116A/118A, and a second portion 132B provided with a hole through which a pin or rivet can be passed to pivotally mount the coupling link 132 on the housing 120. In one embodiment, the pivot axles X1 and X2 joining the swing arms 116 and 118 with the support frame 102 can be parallel to each other and disposed in a same generally horizontal plane. Accordingly, smooth pivoting movements of the swing arms 116 and 118 relative to the support frame 102 can be facilitated.

Referring again to FIGS. 1-4, the mount platform 110 can include a holder frame 142 and a linkage structure 144. In one embodiment, the holder frame 142 may be formed as a closed ring having a peripheral sidewall 146 that encloses a central opening 148 adapted to receive the placement of the infant holding device 104. The sidewall 146 can include a plurality of catch structures 150 distributed around the central opening 148. More specifically, the catch structures 150 may be preferably disposed at rotationally symmetric positions, such that the infant holding device 104 can be fastened on the holder frame 142 of the mount platform 110 at multiple positions rotationally shifted in a horizontal plane.

The linkage structure 144 can have upper ends fixedly joined with the holder frame 142, and lower ends that extend downward from the holder frame 142 and pivotally couples with the swing arms 116 and 118. In the illustrated embodiment, the linkage structure 144 can exemplary include four tubular extensions that are disposed symmetrical on two opposite sides of the holder frame 142. For example, two tubular extensions 146A and 146B may be respectively disposed adjacent to the side sections 116A of the swing arm 116 and have a curved shape with a curvature oriented in a same direction, whereas the two other tubular extensions 146C and 146D may be respectively disposed adjacent to the side sections 118A of the swing arm 118 and also have a curved shape with a curvature oriented in a same direction as the side sections 118A. The upper ends of the tubular extensions 146A, 146B, 146C and 146D can be fixedly joined with the holder frame 142. In alternate embodiments, the upper ends of the tubular extensions 146A and 146D can also be joined with each other so as to form an integral C-shaped tubular section that has a profile including the contour of the tubular extensions 146A and 146D. In a similar manner, the upper ends of the tubular extensions 146B and 146C can also be joined with each other so as to form an integral C-shaped tubular section. Therefore, the four tubular extensions 146A, 146B, 146C and 146D may be advantageously integrated to form two C-shaped tubular sections. The lower ends of the tubular extensions 146A, 146B, 146C and 146D can be respectively coupled with the transverse section 116B and 118B of the swing arms 116 and 118 via a plurality of pivot links 149 whose pivot axes are respectively in line with the axes of the transverse section 116B and 118B of the swing arms 116 and 118, and are located in a substantially horizontal plane and are parallel with the pivot axes of the pivot links joining the swing arms 116 and 118 with the housings 120. The holder frame 142 can be thereby held by the swing arms 116 and 118 at a suitably raised position above the ground. In one embodiment, the holder frame 142 can be exemplary disposed at a height above the swing arms 116 and 118 to lie adjacent to the housings 120. Once it is installed on the holder frame 142 of the mount platform 110, the infant holding device 104 can accordingly lie primarily above the support frame 102 and swing arms 116 and 118, in particular above the pivot links that connect the swing arms 116 and 118 with the support frame 102. As a result, access to the infant holding device 104 can be facilitated for placement and removal of the infant.

It is worth noting that the shape of the linkage structure is not limited to the aforementioned example and any variations may be suitable. In alternate embodiments, the tubular extensions 146A, 146B, 146C and 146D may also have reversely curved, straight, or other shapes.

Figure 5:
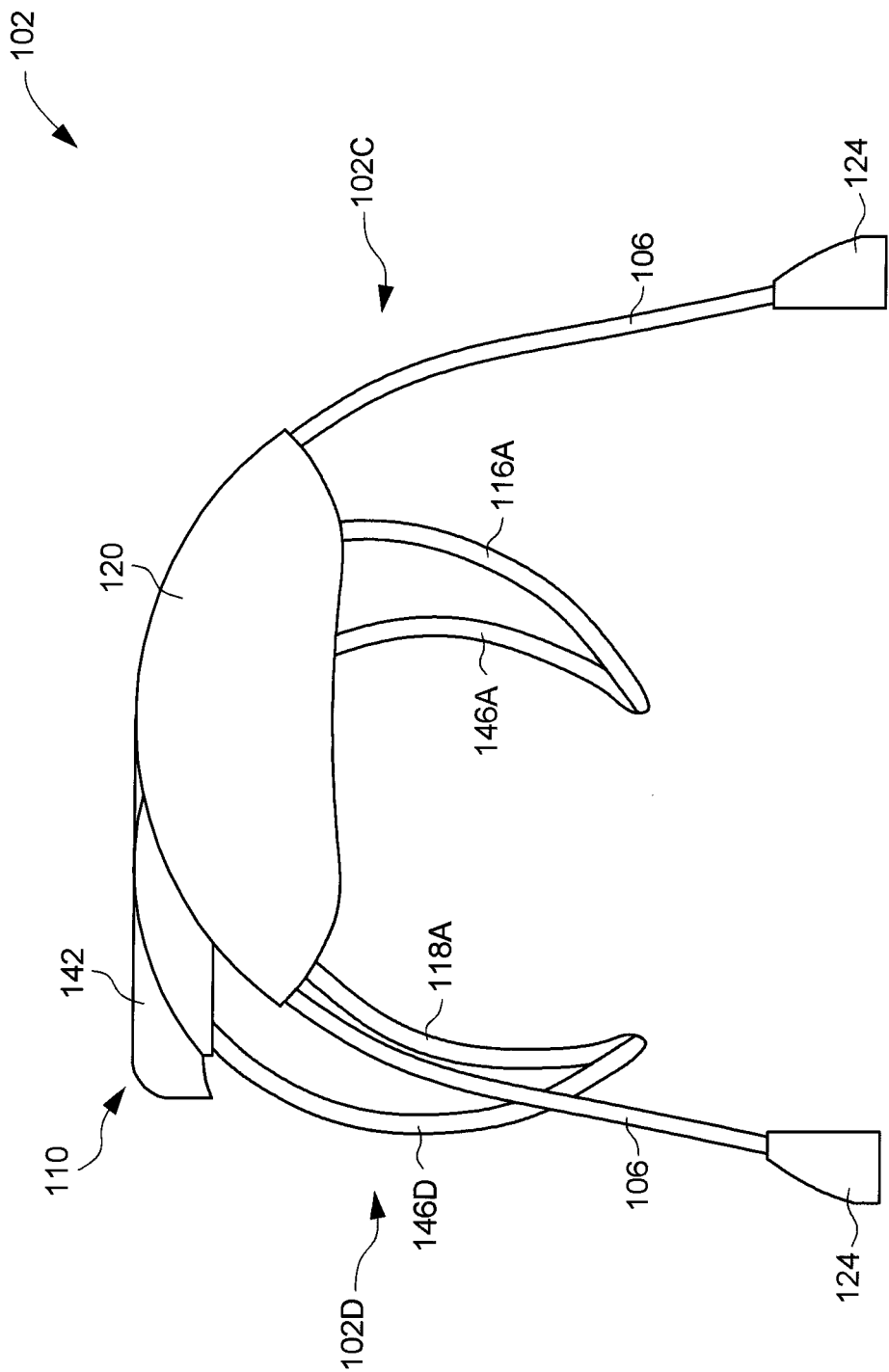
FIGS. 5 and 6 are schematic side views illustrating swinging movements of the mount platform relative to the support frame.
Figure 6:
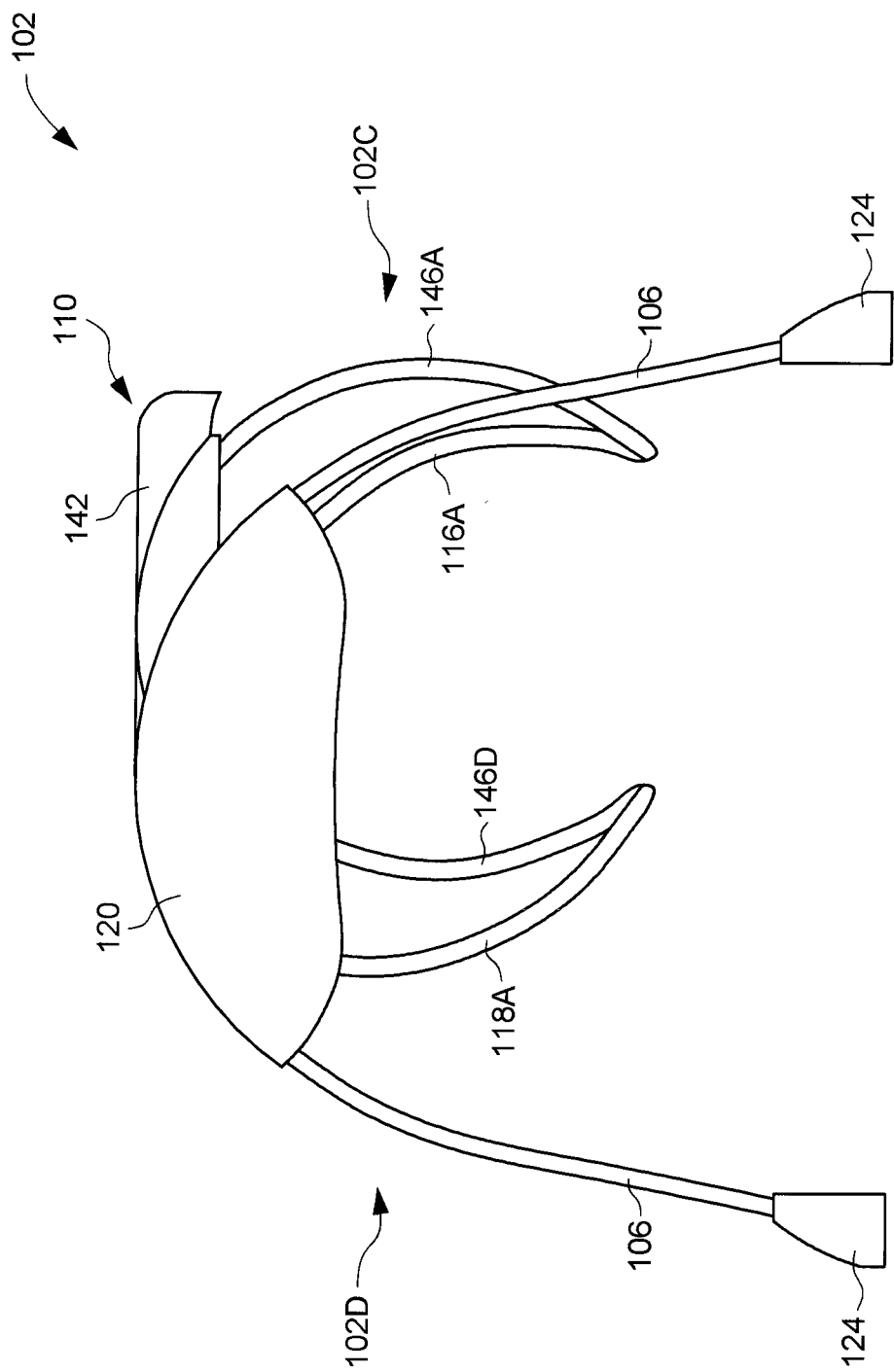

FIGS. 5 and 6 are schematic side views illustrating swinging movements of the mount platform 110 relative to the support frame 102. Driven by the swing arms 116 and 118, the mount platform 110 can swing back and forth toward the opposite third and fourth sides 102C and 102D of the support frame 102. The swinging motion imparted to the mount platform 110 can be either motor-driven, or manually actuated (for example by giving a push or pull impulse to the holder frame 142). As the mount platform 110 swings, the linkage structure 144 self-adjusts relative to the swing arms 116 and 118. The resulting swinging motion can displace the holder frame 142 (and infant holding device 104 placed thereon) vertically and also parallel to a horizontal direction between the sides 102C and 102D. Owing to the self adjustment of the linkage structure 144, the holder frame 142 (and infant holding device 104 placed thereon) can also be kept in a same generally horizontal orientation during the swinging motion. In other words, the inclination of the infant holding device 104, especially the seating surface or the backrest, relative to a horizontal direction remains unchanged during the swinging motion. Accordingly, a more comfortable, safe and entertaining environment can be provided to the infant.

Referring again to FIGS. 1 and 2, the mount platform 110 can also include a storage compartment 152 (shown with dotted lines) provided below the holder frame 142. The storage compartment 152 can be enclosed by a fabric element that is securely wrapped around the tubular extensions 146A, 146B, 146C and 146D of the linkage structure 144 and attached therewith for defining the outer envelop of the storage compartment 152. The storage compartment 152 can be used for conveniently storing various objects and accessories, such as diapers, toys, drinking bottles, etc.

Figure 7:
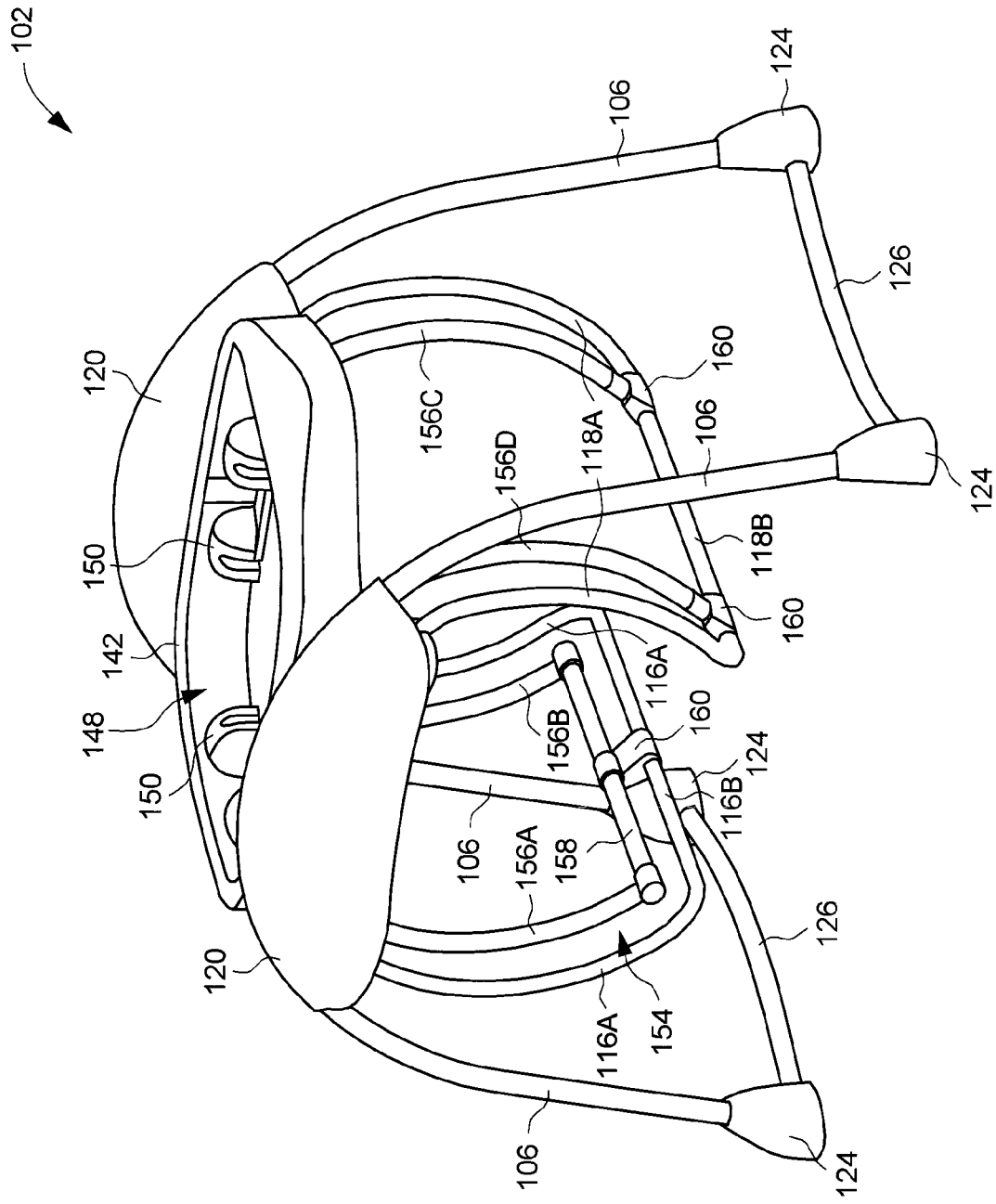
FIG. 7 is a schematic view illustrating another embodiment of a linkage structure used for connecting the mount platform with the swing arms.

It is worth noting that the aforementioned linkage structure 144 may be implemented with a variety of construction. FIG. 7 is a schematic view illustrating another embodiment of a linkage structure 154 used for connecting the mount platform 110 with the swing arms 116 and 118. As shown, the linkage structure 154 can likewise include two tubular extensions 156A and 156B respectively disposed adjacent to the side sections 116A and having a curved shape with a curvature oriented in the same direction as the curvature of the side sections 116A, and two tubular extensions 156C and 156D respectively disposed adjacent to the side sections 118A and also having a curved shape with a curvature oriented in a same direction as the curvature of the side sections 118A. As described previously, the upper ends of the tubular extensions 156A and 156D can be joined with each other so as to form an integral C-shaped tubular section that has a profile including the contour of the tubular extensions 156A and 156D. In a similar manner, the upper ends of the tubular extensions 156B and 156C can also be joined with each other so as to form an integral C-shaped tubular section. Therefore, the four tubular extensions 156A, 156B, 156C and 156D may be advantageously integrated to form two C-shaped tubular sections. In addition, a transverse bar 158 is fixedly joined between the two tubular extensions 156A and 156B, substantially parallel to the transverse section 116B of the swing arm 116.

Rather than the four pivot links previously described, the linkage structure 154 is coupled with the swing arms 116 and 118 via three pivot links 160. More specifically, one pivot link 160 can be used for connecting the transverse bar 158 with the transverse section 116B of the swing arm 116, whereas two other pivot links 160 respectively connect the lower ends of the tubular extensions 156C and 156D with the transverse section 118B of the swing arm 118. Three pivot links are in line with the axes of the transverse section 116B and 118B of the swing arms 116 and 118 respectively. In one embodiment, the pivot axes of the three pivot links 160 can be located in a substantially horizontal plane parallel to the plane of the pivot axles X1 and X2 (as shown in FIG. 4) joining the swing arms 116 and 118 with the support frame 102. Accordingly, the linkage structure 154 can self-adjust in a smooth manner when the swing arms 116 and 118 swing the holder frame 142. With the linkage structure 154, the swinging motion of the swing arms 116 and 118 can likewise cause the holder frame 142 and the infant holding device 104 placed thereon to move vertically and parallel to a horizontal direction, the inclination of the holder frame 142 and the infant holding device 104 relative to a horizontal direction remaining unchanged during the swinging motion.

Figure 8:
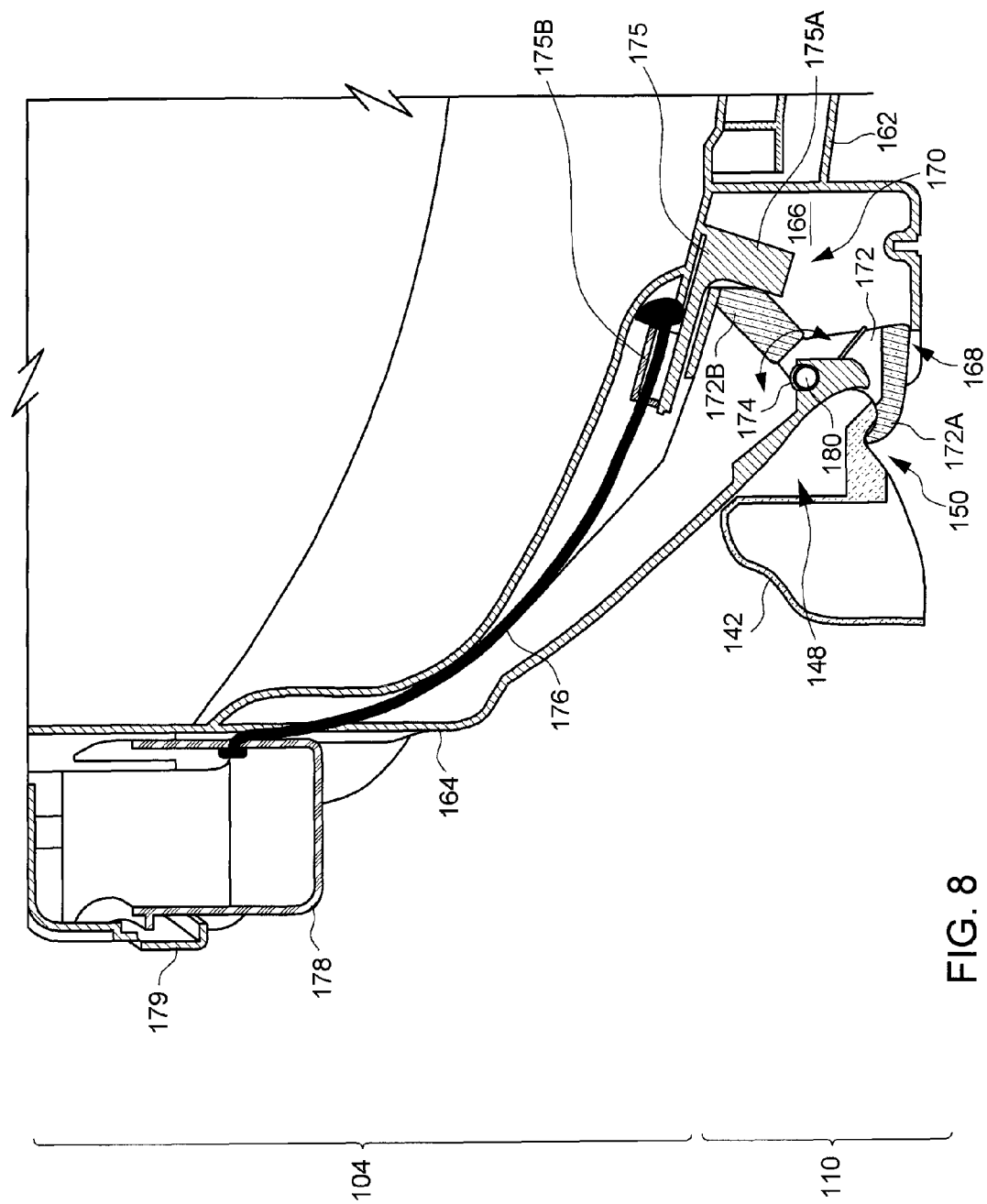
FIG. 8 is a cross-sectional view illustrating how the infant holding device is detachably secured on the mount platform.

FIG. 8 is a partial cross-sectional view illustrating how the infant holding device 104 can be detachably secured on the mount platform 110. The infant holding device 104 can include a base 162, and a shell body 164 connected with a top of the base 162 and having a seat portion for supporting a child thereon (not shown). A bottom of the base 162 can include two inner pockets 166 (only one inner pocket 166 is shown in FIG. 8 for avoiding redundancy) that are disposed laterally spaced apart from each other and are opened on the outer side via openings 168. For securing the infant holding device 104 on the mount platform 110, a fastener mechanism 170 can be provided in the infant holding device 104.

The fastener mechanism 170 can comprise a latch 172 pivotally assembled in each of the inner pockets 166, a spring element 174 connected with the latch 172, and a release actuator system connected with each of the latches 172 comprising a release actuator 175, a link element 176 and a release handle 178.

The latch 172 is assembled in each of the inner pockets 166 via a pivot link 180, and includes a hook portion 172A and an extension arm 172B disposed at different radial directions relative to the pivot link 180. When the latch 172 is driven to rotate in either direction about the axis of the pivot link 180, the hook portion 172A can either extend outward through the opening 168 or retract toward the inner pocket 166.

The spring element 174 can be a torsion spring assembled between the pivot link 180 and the latch 172. The spring element 174 can be operable to bias the latch 172 to rotate in a direction for causing the hook portion 172A to extend outward through the opening 168. When the infant holding device 104 is installed on the mount platform 110, the latches 172 can thereby respectively engage with two corresponding catch structures 150 for locking the infant holding device 104 with the mount platform 110.

The release actuator 175 is slidably assembled with the base 162, and includes a first portion 175A in contact with the extension arm 172B of the latch 172, and a second portion 175B joined with the link element 176. The link element 176 can be a cable or like elongated part having a first end connected with the second portion 175B of the release actuator 175, and a second end remotely connected with the release handle 178. The release handle 178 may be disposed at a location of the shell body 164 that can be conveniently accessible to an adult. For example, the left and right sides of the shell body 164 can respectively form protruding portions 179 having a hollow interior where the release handles 178 can be respectively assembled.

As shown in FIG. 8, the infant holding device 104 can be installed on the mount platform 110 with the base 162 placed through the central opening 148 of the holder frame 142, and the latches 172 approximately aligned with corresponding catch structures 150. Biased by the spring element 174, each of the latches 172 can be urged to a position where the hook portion 172A projects outward through the opening 168 for engaging with the corresponding catch structure 150. As shown, each of the catch structure 150 may be exemplary formed as a recess, groove or slot that can be engaged by the hook portion 172A of the latch 172. The infant holding device 104 can be thereby locked in place on the mount platform 110. The number of latching points between the infant holding device 104 and the mount platform 110 can be appropriately set so that the fastener mechanism 170 can keep the infant holding device 104 securely affixed on the mount platform 110, even when the mount platform 110 performs swinging motion.

For removing the infant holding device 104 from the mount platform 110, the release handle 178 can be pushed for actuating the latch 172. Accordingly, the release handle 178 can draw the link element 176, which in turn drives the release actuator 175 in movement for causing rotation of the latch 172 via the contact between the extension arm 172B of the latch 172 and the first portion 175A of the release actuator 175. The latch 172 rotates in a direction that causes the hook portion 172A to retract toward the inner pocket 166 and disengage from the corresponding catch structure 150 (as shown in dotted lines). The fastener mechanism 170 can be thereby unlocked, and the infant holding device 104 removed from the mount platform 110.

It is worth noting that the amount and distribution of the catch structures 150 permit the infant holding device 104 to lock in different configurations on the mount platform 110. In the illustrated embodiment, the holder frame 142 can be exemplary provided with four catch structures 150 symmetrically distributed around the central opening 148. For example, two catch structures 150 can be respectively provided on two opposite inner sides of the holder frame 142 corresponding to the first and second sides 102A and 102B of the support frame 102, and two other catch structures 150 can be provided on two other opposite inner sides of the holder frame 142 corresponding to the third and fourth sides 102C and 102D of the support frame 102. Accordingly, the infant holding device 104 can be installed and locked in at least two different configurations: a first configuration with the front of the infant holding device 104 oriented toward the first side 102A of the support frame 102, and a second configuration with the front of the infant holding device 104 oriented toward the third side 102C of the support frame 102. When it is installed in the first configuration, the infant holding device 104 can swing sideways. When it is installed in the second configuration, the infant holding device 104 can swing back and forth.

Figure 9:
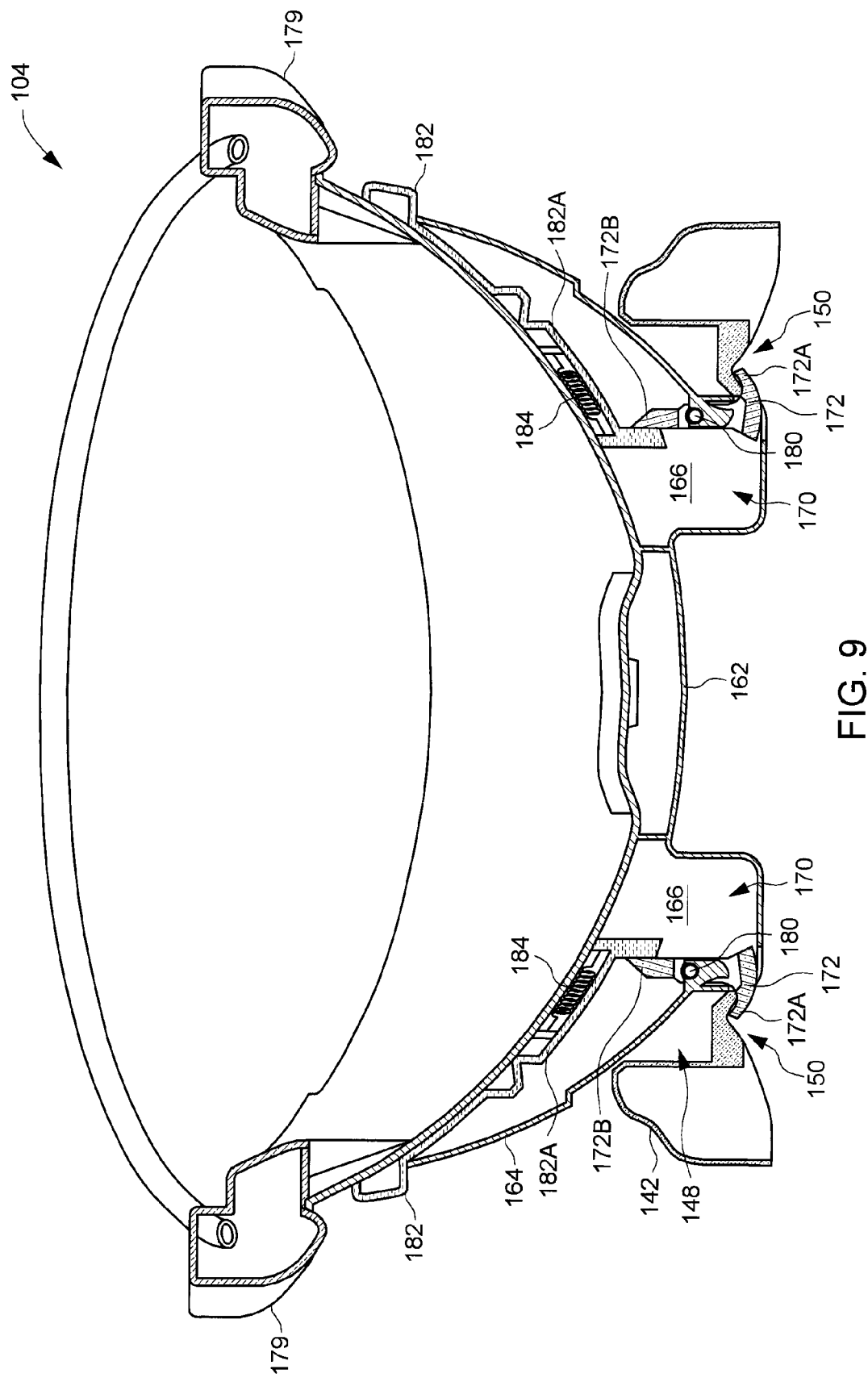
FIG. 9 is a schematic view illustrating another suitable embodiment of a fastener mechanism.

FIG. 9 is a schematic view illustrating another suitable embodiment of the fastener mechanism 170. In FIG. 9, the fastener mechanism 170 likewise includes a latch 172 pivotally assembled in each of the inner pockets 166, and a spring element 174 connected with each of the latches 172. A main difference from the embodiment shown in FIG. 8 lies in the construction of the release actuator system, which comprises a release handle 182 having an extension 182A in direct contact with the extension arm 172B of the latch 172 (the release actuator 175 and link element 176 are omitted in the embodiment of FIG. 9). In addition, an auxiliary spring element 184 can be coupled with the release handle 182 to assist its recovering the initial state.

When the infant holding device 104 is installed on the mount platform 110, the spring element 174 can bias the associated latch 172 to engage with the catch structure 150 in a manner similar to the previous embodiment. When the infant holding device 104 is to be removed, the release handle 182 can be operated to drive a rotational displacement of the latch 172 about the pivot link 180 and cause the hook portion 172A to retract toward the inner pocket 166 and disengage from the corresponding catch structure 150. Once the infant holding device 104 is removed from the mount platform 110, the release handle 182 can recover its initial position by action of the auxiliary spring element 184, and the latch 172 can rotate reversely to have the hook portion 172A protrude outward.

Figure 10:
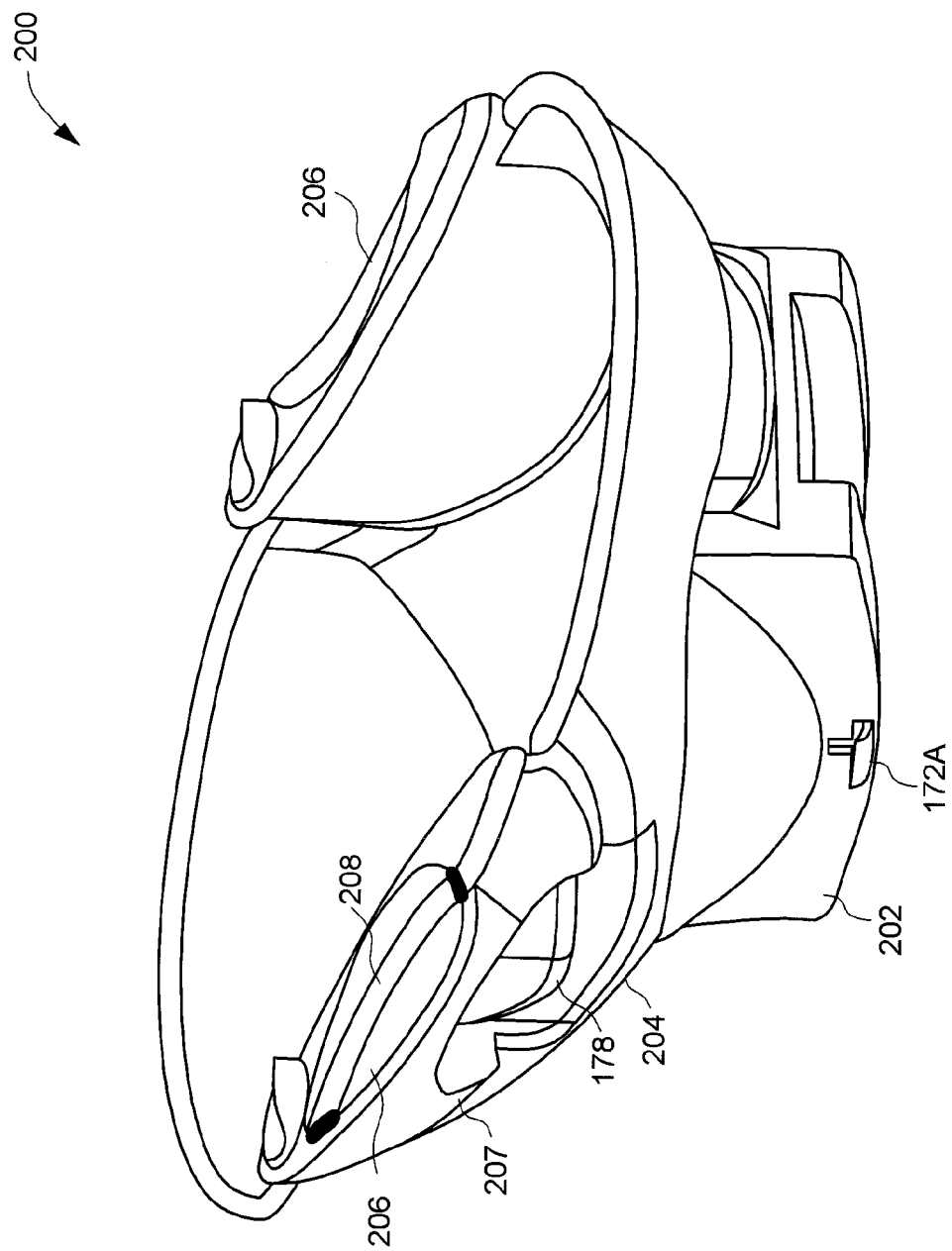
FIG. 10 is a perspective view illustrating an infant holding device embodied as a portable seat.

As previously described, the swing apparatus 100 can accommodate a variety of infant holding device thereon. FIG. 10 is a perspective view illustrating an infant holding device embodied as a portable seat 200 (such as a child safety seat used for seating a young child in an automotive vehicle). The portable seat 200 can include a base 202 provided with the fastener mechanism 170 described previously, and a shell body 204 connected with a top of the base 202. Two lateral sides of the shell body 204 can be provided with a recessed region 206 adapted to fit with the shape of an adult hip. In particular, each of the recessed regions 206 may be formed on the outer surface of a protruding portion 207 where the release handle 178 of the fastener mechanism 170 is assembled. A grasp handle 208 made of a flexible material can also be attached on each side of the shell body 204 adjacent to the recessed region 206.

When the portable seat 200 is carried, the adult can place the portable seat 200 such that the recessed region 206 rests against the hip of the adult on one side, and grip the grasp handle 208 with one hand on the other side. As a result, the weight of the portable seat 200 (and child seated thereon) can be at least partially sustained by the hip and body of the adult, so that the adult need not use two hands for carrying the portable seat 200.

Figure 11:
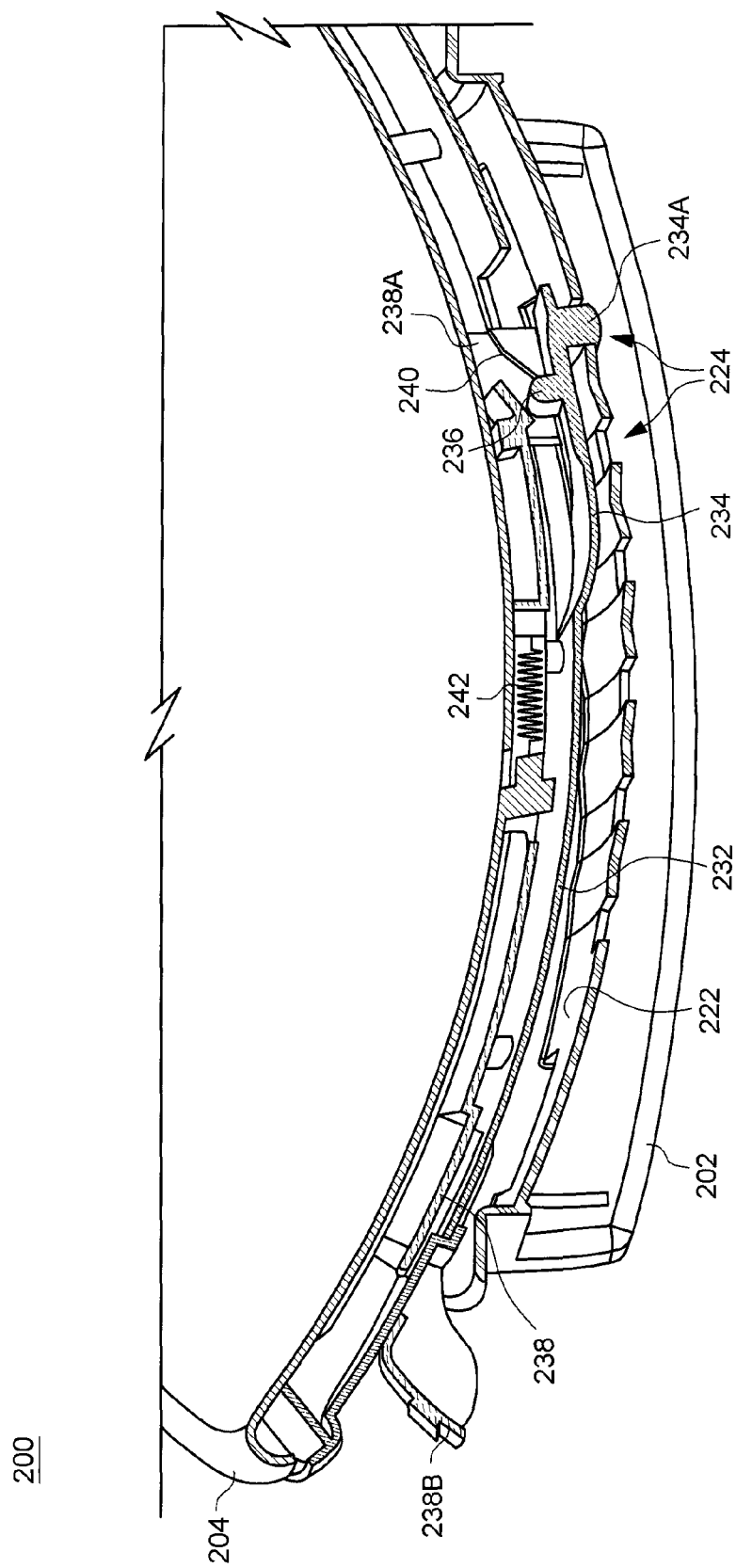
FIG. 11 is a cross-sectional view illustrating a variant embodiment of the portable seat.

It will be appreciated that the base 202 and the shell body 204 can be either affixed with each other in a permanent manner, or movable relative to each other for adjusting a reclined position of the shell body 204. FIG. 11 is a cross-sectional view illustrating a variant embodiment of the portable seat 200 including an adjustment mechanism for reclining the shell body 204 relative to the base 202. As shown, the shell body 204 may be movably assembled with the base 202, such that the shell body 204 can be adjusted to different reclined positions. An upper surface 222 of the base 202 can include a plurality of locking slots 224 distributed at spaced-apart locations corresponding to different reclined positions of the shell body 204. A bottom surface 232 of the shell body 204 facing the upper surface 222 of the base 202 can include a detent arm 234 that has a protrusion 234A adapted to engage with any of the locking slots 224 on one side, and a boss 236 on another side opposite to the protrusion 234A.

As shown in FIG. 11, the shell body 204 also includes a movable actuator handle 238 that lies adjacent to the detent arm 234 and extends toward a front end of the shell body 204. A first end 238A of the actuator handle 238 can form an enlarged portion provided with a ramped surface 240 against which the boss 236 lies in contact. A spring element 242 is coupled between the actuator handle 238 and the shell body 204 for biasing the actuator handle 238 toward the inner side of the shell body 204.

For adjusting the position of the shell body 204 relative to the base 202, a second end 238B of the actuator handle 238 can be pulled in a direction that loads the spring element 242. As the actuator handle 238 moves, the engagement between the boss 236 and the ramped surface 240 drives deflection of the detent arm 234 in a direction that causes the protrusion 234A to disengage from the locking slot 224.

Being unlocked, the shell body 204 can accordingly be adjusted to a desirable position relative to the base 202. Once the desired position is reached, the spring element 242 can bias the actuator handle 238 in a reverse direction, which causes deflection of the detent arm 234 in a reverse direction guided by the interaction between the ramped surface 240 and the boss 236. As a result, the protrusion 234A can engage with another corresponding locking slot 224 for locking the shell body 204 in position relative to the base 202.

Figure 12:
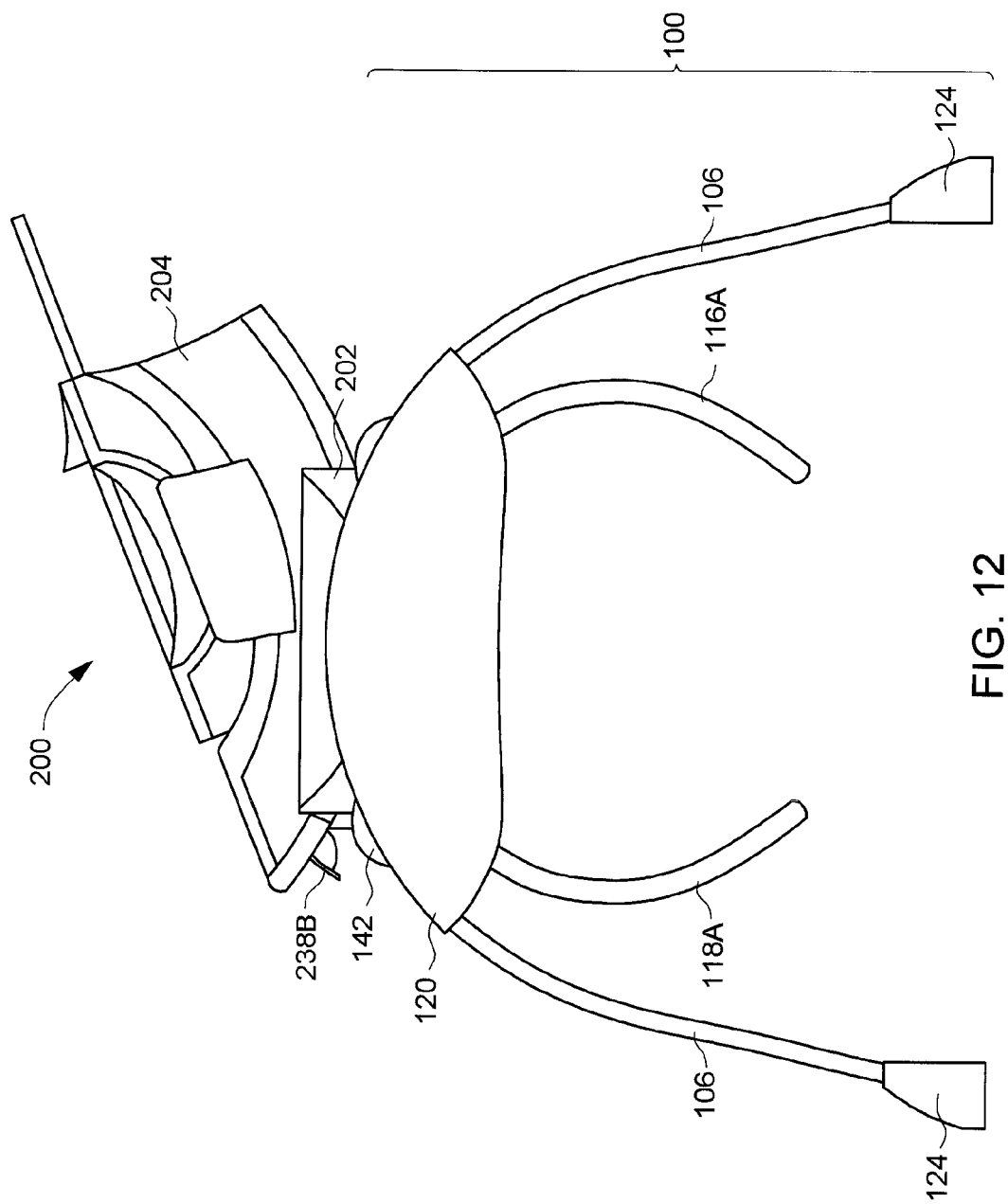
FIGS. 12 and 13 are schematic views illustrating the portable seat shown in FIG. 11 at different inclinations on the swing apparatus.
Figure 13:
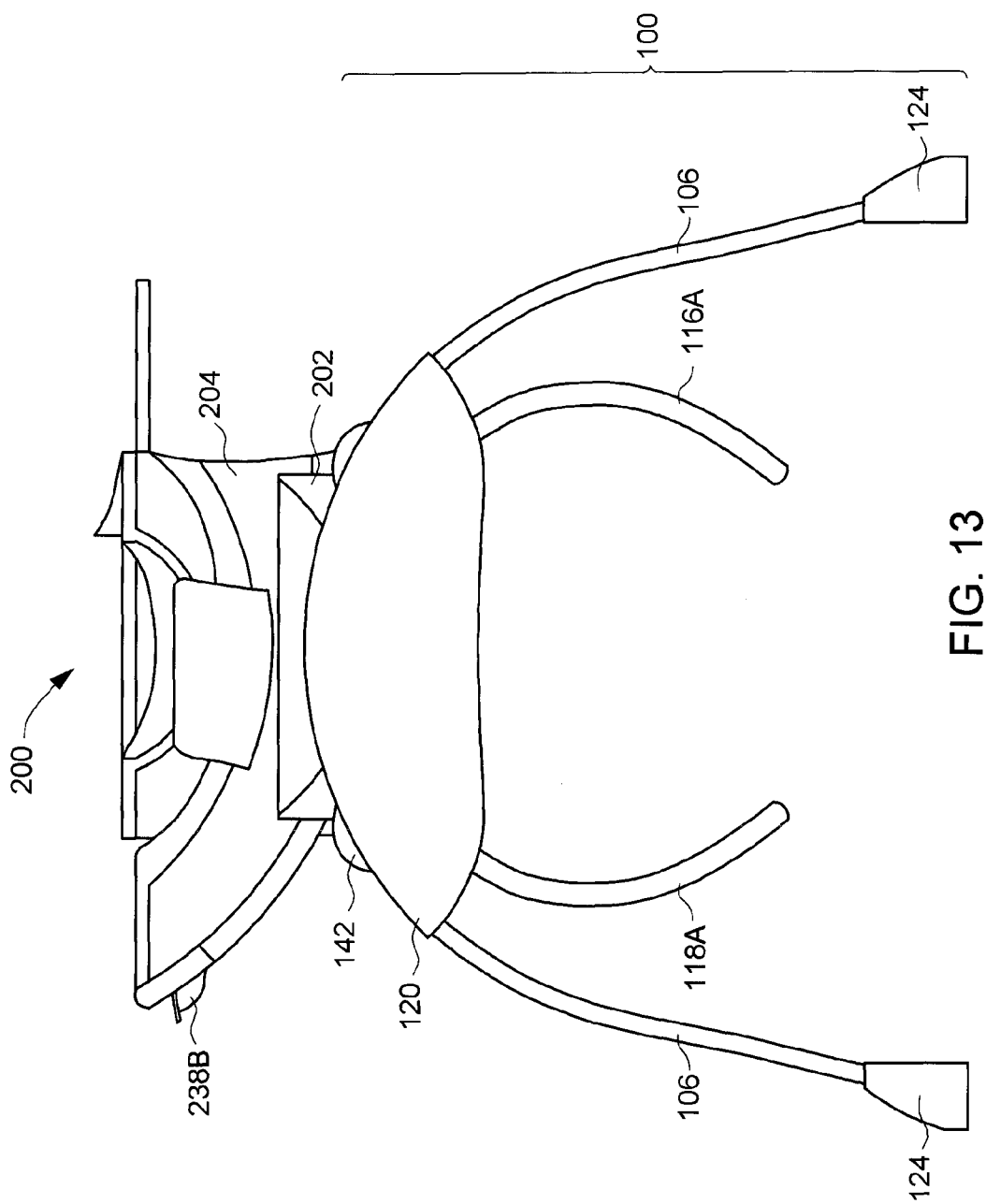

FIGS. 12 and 13 are schematic views illustrating different inclinations of the portable seat 200 on the swing apparatus 100. In FIG. 12, the portable seat 200 can be installed on the swing apparatus 100 in a configuration where the shell body 204 is held in an upright position relative to the base 202. In FIG. 13, the portable seat 200 can be installed on the swing apparatus 100 in a configuration where the shell body 204 is held in a full reclined position relative to the base 202. With the ability to modify the inclination of the seat on the swing apparatus 100, the seating position of the infant can be adjusted in a more flexible manner to provide optimal comfort and even more swing configurations, e.g., back and forth or sideways swing in the upright position, back and forth or sideways swing in the full reclined position.

Figure 14:
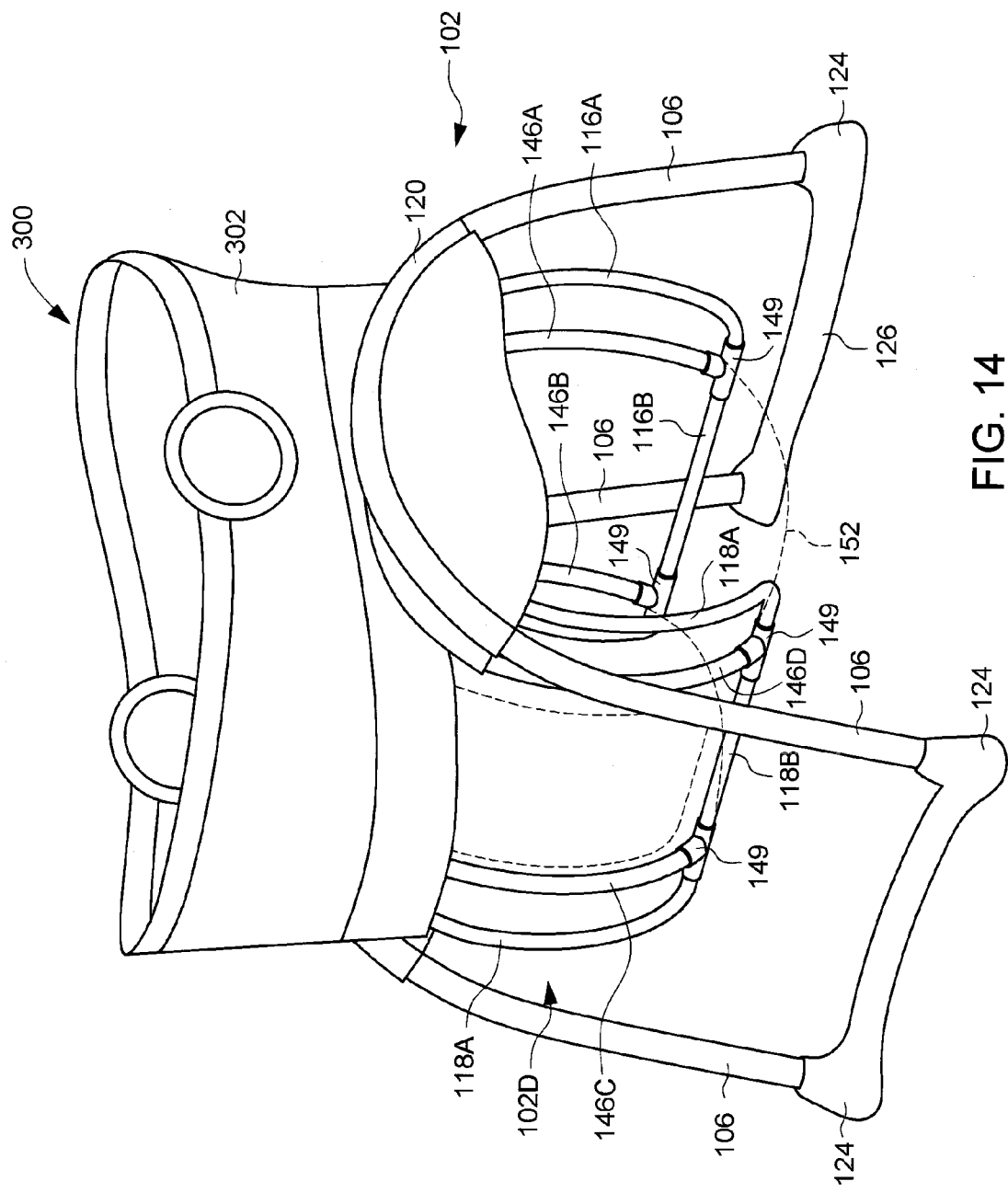
FIG. 14 is a schematic view illustrating a variant embodiment in which the infant holding device installed on the mount platform is a bassinet.

FIG. 14 is a schematic view illustrating a variant embodiment in which the infant holding device installed on the mount platform 110 can be a bassinet 300. The bassinet 300 can include a side enclosure 302 that surrounds an inner space adapted to receive the placement of a child. The bassinet 300 can also have a base provided with a fastener mechanism through which the bassinet 300 can be locked with the mount platform 110 as described previously.

At least one advantage of the swing apparatus described herein is the ability to install a variety of infant holding devices on the support frame of the swing apparatus. The infant holding device can be installed in different configurations to achieve either of back and forth swing movements, or sideways swing movements. Accordingly, the swing apparatus can be used in a more versatile manner. Moreover, once it is installed on the mount platform, the infant holding device can be positioned above the support frame and swing arms, in particular above the pivot links that connect the swing arms with the support frame. As a result, access to the infant holding device can be facilitated for placement and removal of the infant.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A swing apparatus comprising:
a support frame;
a plurality of swing arms pivotally connected with the support frame;
a mount platform connected with the swing arms, wherein the mount platform includes a holder frame, and a linkage structure having an upper part joined with the holder frame and a lower part that extends downward from the holder frame and couples with the swing arms, and the swing arms are operable to swing the mount platform relative to the support frame; and
a portable infant holding device adapted to removably fasten with the holder frame of the mount platform.

2. The swing apparatus according to claim 1, wherein the holder frame includes a peripheral sidewall that encloses a central opening, the peripheral sidewall including a plurality of catch structures adapted to lock with a fastener mechanism provided on the portable infant holding device.

3. The swing apparatus according to claim 2, wherein the fastener mechanism comprises two latches pivotally mounted on two opposite sides of the infant holding device, the latches being operable to engage with and disengage from two corresponding ones of the catch structures.

4. The swing apparatus according to claim 2, wherein the catch structures are disposed on a plurality of opposite sides around the central opening for allowing the portable infant holding device to be fastened on the holder frame in different orientations relative to the swing arms.

5. The swing apparatus according to claim 4, wherein the different orientations include a first position for swinging the portable infant holding device back and forth, and a second position for swinging the portable infant holding device sideways.

6. The swing apparatus according to claim 1, wherein the support frame has two opposite sides respectively provided with a plurality of upstanding legs, and the upstanding legs on each of the two opposite sides respectively have upper ends joined with a housing.

7. The swing apparatus according to claim 6, wherein the swing arms include two swing arms, each of which has a generally U-shaped profile including two parallel side sections respectively coupled pivotally with the housings on the two opposite sides of the support frame, and a transverse section joining lower ends of the side sections.

8. The swing apparatus according to claim 7, wherein
the upper part of the linkage structure is fixedly joined with the holder frame, and the lower part of the holder frame pivotally couples with the transverse sections of the swing arms.

9. The swing apparatus according to claim 8, wherein the linkage structure includes a plurality of tubular extensions that are disposed symmetrical on two opposite sides of the holder frame.

10. The swing apparatus according to claim 9, wherein the tubular extensions include two first tubular extensions that are respectively connected with the transverse section of one of the two swing arms via two first pivot links having a same first pivot axis, and two second tubular extensions that are respectively connected with the transverse section of the other one of the two swing arms via two second pivot links having a same second pivot axis parallel to the first pivot axis.

11. The swing apparatus according to claim 10, wherein the first and second pivot axes are located in a substantially horizontal plane.

12. The swing apparatus according to claim 9, wherein the tubular extensions include two first tubular extensions that are respectively connected with the transverse section of one of the two swing arms via two first pivot links having a same first pivot axis, and two second tubular extensions that are downwardly joined with each other via a transverse extension, the transverse extension being connected with the transverse section of the other one of the two swing arms via a second pivot link having a second pivot axis parallel to the first pivot axis.

13. The swing apparatus according to claim 1, wherein the mount platform further includes a storage compartment below the holder frame.

14. The swing apparatus according to claim 13, wherein the storage compartment is enclosed by a fabric element securely affixed with the linkage structure.

15. The swing apparatus according to claim 1, wherein the mount platform is held at a height above the swing arms.

16. The swing apparatus according to claim 15, wherein the infant holding device once installed on the holder frame lies above the support frame and the swing arms.

17. The swing apparatus according to claim 1, wherein the infant holding device includes a shell body provided with a recessed region on a first side adapted to rest in contact with an adult hip, and a grasp handle on a second side opposite to the recessed region.

18. The swing apparatus according to claim 1, wherein the infant holding device includes a portable infant car seat, or a bassinet.

19. The swing apparatus according to claim 1, wherein the infant holding device includes a portable seat having a base and a shell body, the shell body being adjustable relative to the base between different inclinations.

20. A swing apparatus comprising:

a support frame;

a plurality of swing arms pivotally connected with the support frame;

a mount platform connected with the swing arms such that the swing arms are operable to swing the mount platform relative to the support frame, wherein the mount platform includes a holder frame and a linkage structure, the holder frame including a peripheral sidewall that encloses at least partially a central opening and includes a plurality of catch structures adapted to lock with a fastener mechanism provided on the portable infant holding device, and the linkage structure having an upper part joined with the holder frame and a lower part coupled with the swing arms; and a portable infant holding device adapted to removably fasten with the holder frame of the mount platform;

wherein the swing arms are operable to cause a swinging motion during which the holder frame and the infant holding device placed thereon are displaced vertically and parallel to a horizontal direction, and the inclination of the holder frame and the infant holding device relative to a horizontal direction remains unchanged during the swinging motion.

* * * * *